United States Patent
Magner et al.

(10) Patent No.: US 10,909,785 B2
(45) Date of Patent: Feb. 2, 2021

(54) BASE CONTROL MODULE FOR VEHICLES

(71) Applicant: TriMark Corporation, New Hampton, IA (US)

(72) Inventors: David S. Magner, Decorah, IA (US); Anita L. Reichling, Boscobel, WI (US); Nicholas L. Kloxin, New Hampton, IA (US); Todd Keaffaber, Hillsboro, OR (US); Santosh Balakrishnan, Portland, OR (US); Robert D. Lawson, Johnston, IA (US)

(73) Assignee: TriMark Corporation, New Hampton, IA (US)

( * ) Notice: Subject to any disclaimer, the term of this patent is extended or adjusted under 35 U.S.C. 154(b) by 0 days.

(21) Appl. No.: 15/911,735

(22) Filed: Mar. 5, 2018

(65) Prior Publication Data

US 2018/0253919 A1   Sep. 6, 2018

Related U.S. Application Data

(60) Provisional application No. 62/467,610, filed on Mar. 6, 2017.

(51) Int. Cl.
*G07C 9/00* (2020.01)
*B60R 25/24* (2013.01)
*B60R 25/01* (2013.01)

(52) U.S. Cl.
CPC .......... *G07C 9/00309* (2013.01); *B60R 25/01* (2013.01); *B60R 25/24* (2013.01);
(Continued)

(58) Field of Classification Search
CPC ...... G07C 9/00309; G07C 2009/00261; G07C 2009/00333; G07C 2009/00507;
(Continued)

(56) References Cited

U.S. PATENT DOCUMENTS 5,040,990 A * 8/1991 Suman .................... B60R 11/00
                                                        296/37.7
5,650,929 A * 7/1997 Potter ................. B60R 16/0315
                                                        455/456.1

(Continued)

OTHER PUBLICATIONS

JAE—MX34 series details web page /www.jae.com/jccom/en/connectors/detail/MX34 by JAE dated Apr. 19, 2016 from the wayback machine (Year: 2016).*

*Primary Examiner* — Edwin C Holloway, III
(74) *Attorney, Agent, or Firm* — McKee, Voorhees & Sease, PLC

(57) ABSTRACT

A base control module for vehicles comprises, a controller which includes a housing, a programmable processor, on-board memory, and a plurality of inputs and outputs. The module also comprises, a set of pluggable module interfaces each comprising a standardized connector for any of a plurality of interchangeable pluggable modules, with each pluggable module having a different functionality, and each connector having a plurality of pins. A standardized communication protocol is provided between the base control module and any of the pluggable modules. Adaptable software on the base control module that can assign different configurations for the pins of the connector dependent upon the functionality of the pluggable module for those pins. The same base control module and set of pluggable module interfaces can be used for different pluggable modules.

22 Claims, 9 Drawing Sheets

(52) U.S. Cl.
CPC .............. *G07C 2009/00261* (2013.01); *G07C 2009/00333* (2013.01); *G07C 2009/00507* (2013.01); *G07C 2009/00611* (2013.01); *G07C 2209/63* (2013.01); *G07C 2209/65* (2013.01)

(58) Field of Classification Search
CPC ...... G07C 2009/00611; G07C 2209/63; G07C 2209/65; G07C 2209/64; G07C 2009/00761; G07C 2209/10; B60R 25/01; B60R 25/24; B60R 2011/0288; B60R 2011/0294; B60R 2021/01006; B60R 2021/0104; B60R 2021/01047; B60R 2021/01054; B60R 2021/01081
USPC ............................................ 340/5.72, 426.36
See application file for complete search history.

(56) References Cited

U.S. PATENT DOCUMENTS

| | | | |
|---|---|---|---|
| 6,333,698 B1 * | 12/2001 | Roddy | B60R 25/24 340/13.21 |
| 6,526,340 B1 * | 2/2003 | Reul | G05B 23/027 340/439 |
| 6,553,039 B1 * | 4/2003 | Huber | B60R 16/0315 370/466 |
| 6,700,795 B1 | 3/2004 | Jones et al. | |
| 6,789,003 B2 | 9/2004 | Magner et al. | |
| 7,034,655 B2 | 4/2006 | Magner et al. | |
| 7,064,658 B2 | 6/2006 | Burlak et al. | |
| 7,119,709 B2 | 10/2006 | Magner et al. | |
| 7,289,035 B2 | 10/2007 | Nathan et al. | |
| 7,460,005 B2 | 12/2008 | Nathan et al. | |
| 8,330,575 B2 | 12/2012 | Vincent | |
| 8,334,750 B2 | 12/2012 | Kim et al. | |
| 8,350,669 B2 | 1/2013 | Magner et al. | |
| 8,362,886 B2 | 1/2013 | Flick | |
| 8,373,541 B2 | 2/2013 | Tarmoom et al. | |
| 8,421,590 B2 | 4/2013 | Taki et al. | |
| 8,451,087 B2 | 5/2013 | Krishnan et al. | |
| 8,650,351 B2 | 2/2014 | Hu et al. | |
| 8,843,277 B2 | 9/2014 | Fuchs et al. | |
| 8,976,014 B2 | 3/2015 | Magner et al. | |
| 9,100,450 B2 | 8/2015 | Matsuo | |
| 9,196,104 B2 | 11/2015 | Dumas et al. | |
| 10,385,594 B2 * | 8/2019 | Magner | E05B 81/64 |
| 2002/0140289 A1 * | 10/2002 | McConnell | B60R 11/02 307/10.1 |
| 2004/0030462 A1 * | 2/2004 | Magner | B60R 25/2009 701/2 |
| 2004/0150509 A1 * | 8/2004 | Dunn | B60R 25/00 340/5.72 |
| 2004/0225415 A1 * | 11/2004 | Newberry | G06F 15/7867 701/1 |
| 2007/0040649 A1 * | 2/2007 | Dulgerian | B60R 25/24 340/5.64 |
| 2007/0228826 A1 * | 10/2007 | Jordan | H01R 9/226 307/10.1 |
| 2010/0007463 A1 * | 1/2010 | Dingman | B60Q 1/2669 340/5.72 |
| 2010/0102928 A1 * | 4/2010 | Chang | H04N 7/188 340/5.72 |
| 2010/0312418 A1 * | 12/2010 | Kraft | G06F 13/409 701/1 |
| 2011/0057772 A1 * | 3/2011 | Nagao | B60R 25/00 340/5.61 |
| 2012/0280805 A1 * | 11/2012 | Magner | G07C 9/00174 340/426.11 |

* cited by examiner

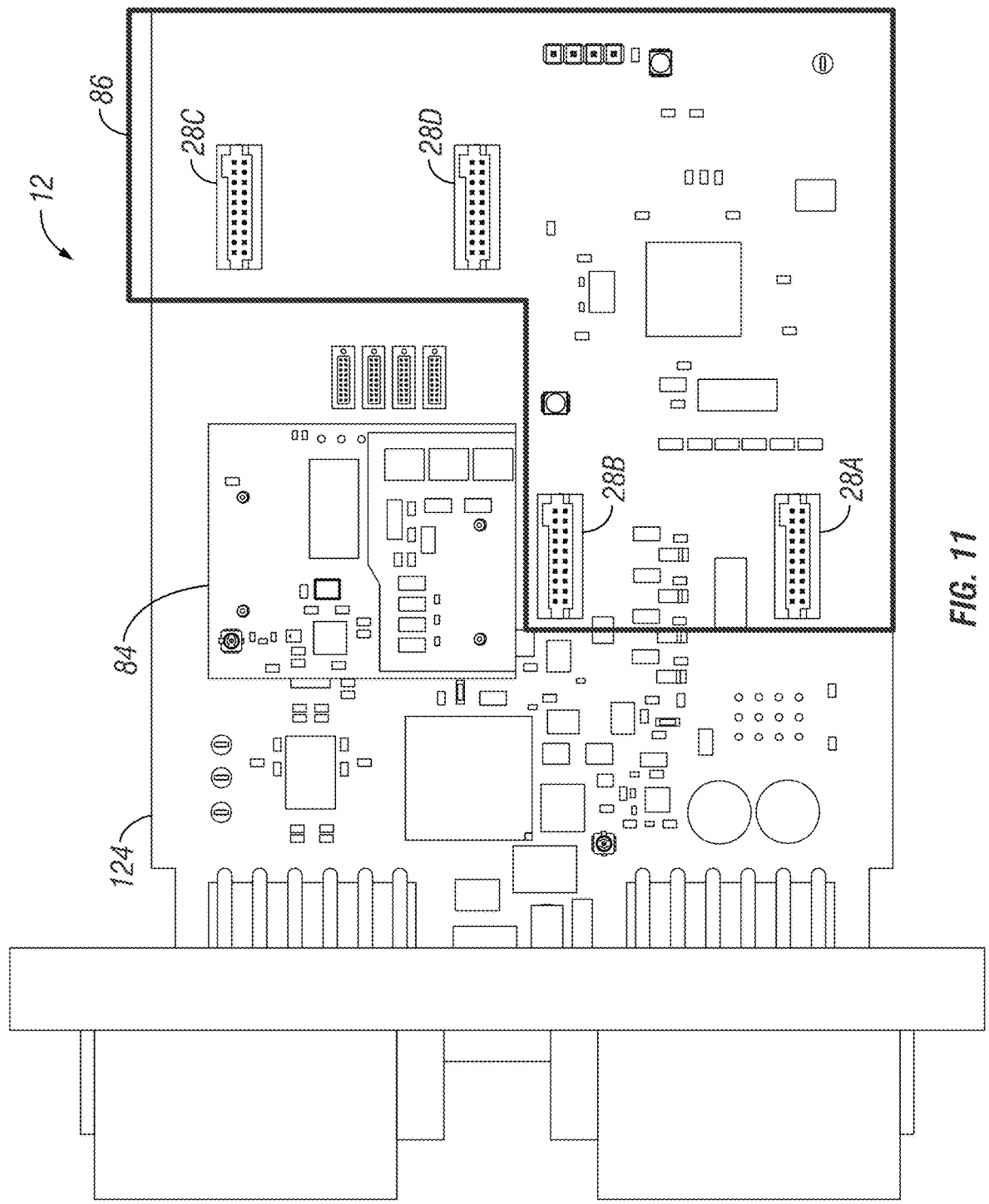

BASE CONTROL MODULE FOR VEHICLES

CROSS-REFERENCE TO RELATED APPLICATIONS

This application claims priority to provisional application U.S. Ser. No. 62/467,610 filed Mar. 6, 2017, which is incorporated herein by reference in its entirety.

FIELD OF THE INVENTION

The present invention relates to enhanced security and functionality for vehicles. More specifically, but not exclusively, the present invention relates to vehicle security systems in a door handle assembly with configurable remote passive keyless entry features and interchangeable modules and base controller interfaces for interchangeable or pluggable modules for different functionalities.

BACKGROUND OF THE INVENTION

Various types of control modules are used with agricultural and construction machinery, military equipment, heavy trucks and other vehicles. Traditionally these modules are assigned for specific purposes to control predetermined functions.

However, there continues to be a need in the industry for improved control modules that provide plug-in hardware and software customization to provide additional functionality. Included in this additional functionality are features for "hands free" passive keyless entry (PKE), vehicle/equipment starting, as well as security and other vehicle/equipment functions.

Therefore, what is needed is an electronic access system and vehicular security system which is particularly well-suited for non-automotive vehicles, is adaptable and configurable for use in a variety of different vehicle applications and provides security in a way that is convenient to the original equipment manufacturer, vehicle integrators and end-user operators.

Thus, control modules are needed which can be configured with different functionality with adjustments to hardware or software, wherein the software is adjusted with flashable memory to define different inputs and outputs, thus expanding their functionality. Likewise, "plug-in" swappable hardware is needed which adds enhanced functionality via it's dedicated architecture.

SUMMARY OF THE INVENTION

Therefore, it is a primary object, feature, or advantage of the present invention to improve upon the state of the art.

A further object, feature, or advantage of the present invention is the provision of a keyless access system for a vehicle, and a method of operating the keyless access system.

An improved door handle assembly is provided for vehicles and comprises a base controller which includes a housing, a programmable processor, on-board memory, and a plurality of inputs and outputs. The controller also comprises a set of pluggable module interfaces each comprising a standardized connector for any of a plurality of interchangeable pluggable modules. With each pluggable module having a different functionality, and each connector having a plurality of pins, the assembly uses a standardized communication protocol between the base controller and any of the pluggable modules. The base controller has adaptable software that can assign different configurations for the pins of the connector depending upon the functionality of the pluggable module for those pins. The controller further comprising, so the same base controller and set of pluggable module interfaces can utilize different pluggable modules simultaneously.

A still further object, feature, or advantage of the present invention is to provide an improved vehicle entry system wherein the vehicle is an on-road vehicle or off-road vehicle.

Another object, feature or advantage of the present invention is to provide an improved base controller for a vehicle entry system wherein the base controller comprises an intelligent controller that implements logic and basic I/O interfaces.

Another object, feature or advantage of the present invention is to provide an improved base controller for a vehicle entry system wherein the basic I/O interfaces comprise one or more keypad interfaces to support legacy keypads and a pluggable proximity interface for proximity sensing.

Another object, feature or advantage of the present invention is to provide an improved base controller for a vehicle entry system further comprising one or more of an LF antenna management component and a PKE/immobilizer transponder.

Another object, feature or advantage of the present invention is to provide an improved base controller for a vehicle entry system wherein the pluggable module interface comprises I/O lines that function with SPI or UART protocol. All pins are made common and the interface protocol is made common.

Another object, feature or advantage of the present invention is to provide an improved base controller for a vehicle entry system wherein the pluggable module comprises board to board connectors, and the connectors being rated for multiple insertions and removals.

Another object, feature or advantage of the present invention is to provide an improved base controller for a vehicle entry system wherein the board to board connectors comprise a MX34R or similar.

Another object, feature or advantage of the present invention is to provide an improved base controller for a vehicle entry system in combination with one or more pluggable modules.

Another object, feature or advantage of the present invention is to provide a controller assembly for a vehicle entry system wherein the pluggable modules are selected from PKE, RKE, NFC, Bluetooth, fob management, or GSM/GPS.

Yet another object, feature, or advantage of the present invention is a vehicle entry system for highly adaptable functionality with a base controller operatively installed in a vehicle, wherein the controller comprises, a base controller having a programmable intelligent controller and controller logic, a plurality of basic I/O interfaces, and at least one pluggable module interface. The pluggable module interface comprises, a standardized connector with a plurality of pins. At least one pluggable module having a functionality is provided, with board-to-board connectors rated for multiple insertions and removals. A standardized protocol provides communication between the base controller and the pluggable module.

Another object, feature or advantage of the present invention is to provide a vehicle entry system wherein the vehicle may be an on-road vehicle or off-road vehicle.

Another object, feature or advantage of the present invention is to provide a vehicle entry system wherein the functionality of the pluggable module comprises one of a PKE, RKE, NFC, Bluetooth, fob management, or GSM/GPS.

Another object, feature or advantage of the present invention is to provide a vehicle entry system further comprising a plurality of pluggable module interfaces on the base controller.

Another object, feature or advantage of the present invention is to provide a vehicle entry system wherein each of the plurality of pluggable module interfaces is adaptable by programming to interface with a variety of pluggable modules.

A further object, feature, or advantage of the present invention is a method of operating the vehicle entry system an on-road or off-road vehicle comprising, operatively installing a base controller in the vehicle. One method includes adding a plurality of pluggable module interfaces to the base controller, with each pluggable module interface being adaptable to receive an interchangeable pluggable module having one or a variety of functionalities.

Another object, feature or advantage of the present invention is to provide a method of operating the vehicle entry system wherein pluggable module interfaces have a plurality of pins in a connector, and the pins comprise I/O lines that function with SPI or UART protocol. All pins are made common and the interface protocol is made common.

Another object, feature or advantage of the present invention is to provide a method of operating a vehicle entry system wherein the I/O lines function with SPI or UART protocol.

Another object, feature or advantage of the present invention is to provide a method of operating a vehicle entry system wherein the pluggable modules comprise board-to-board connectors.

Another object, feature or advantage of the present invention is to provide a method of operating a vehicle entry system wherein the pluggable modules support PKE, RKE, NFC, Bluetooth, fob management, or GSM/GPS.

BRIEF DESCRIPTION OF THE DRAWINGS

FIG. 11 is a detailed PCB of the base control module.

DETAILED DESCRIPTION OF THE INVENTION

The present invention provides for a handle assembly with a keyless access system for a vehicle door. Although the term "keyless entry" system is more commonly used, the term "keyless access" system is used herein because the present invention provides for vehicle functions beyond merely entry into the vehicle.

Figure 1:
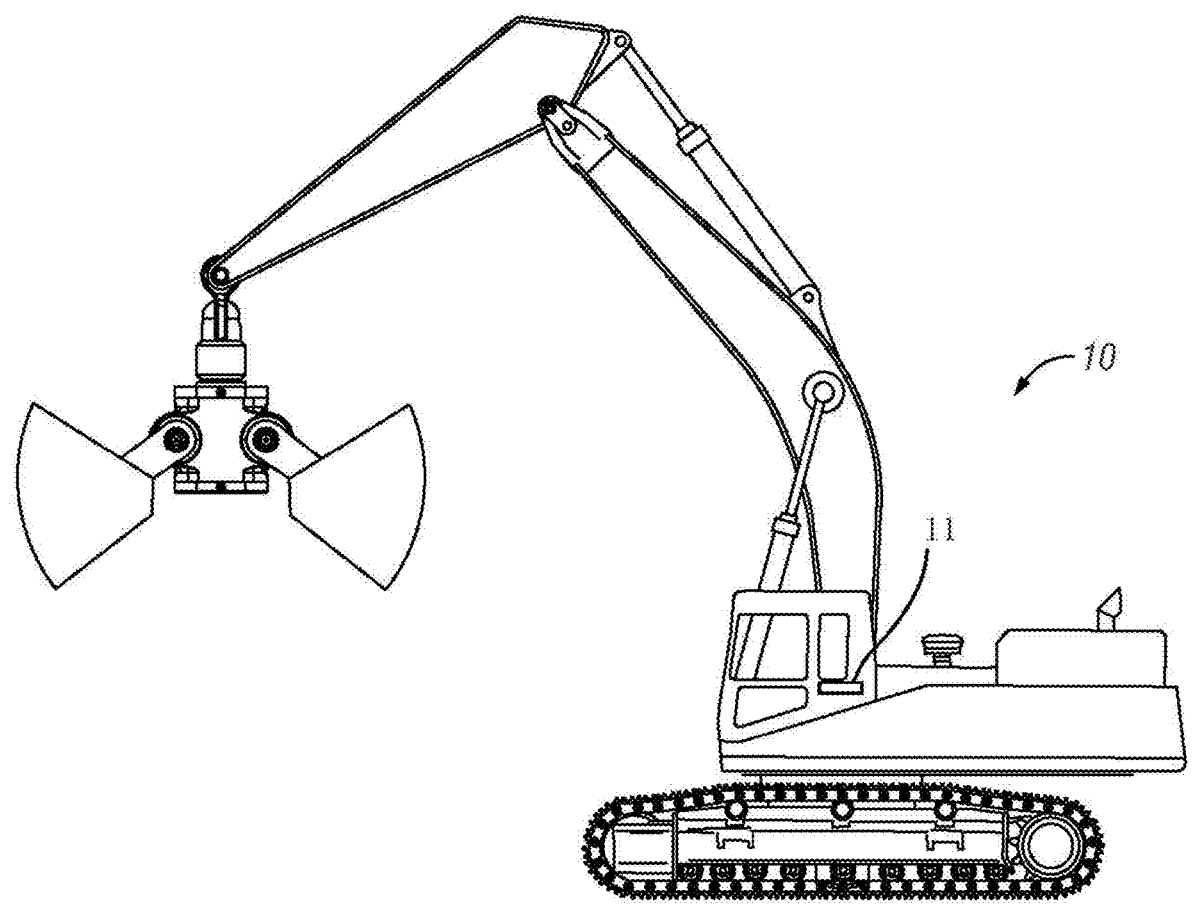
FIG. 1 is a pictorial representation of an example of a vehicle equipped with the door handle control module of the present invention.

FIG. 1 illustrates one example of a non-automotive vehicle 10. Although a particular non-automotive vehicle 10 is shown, the present invention contemplates numerous types of non-automotive vehicles may be used. The present invention can be used in numerous applications, including vehicles such as semi-truck tractors, ambulances, construction equipment, military, and other types of vehicles. These vehicles may be on-road, off-road or both.

Figure 2:
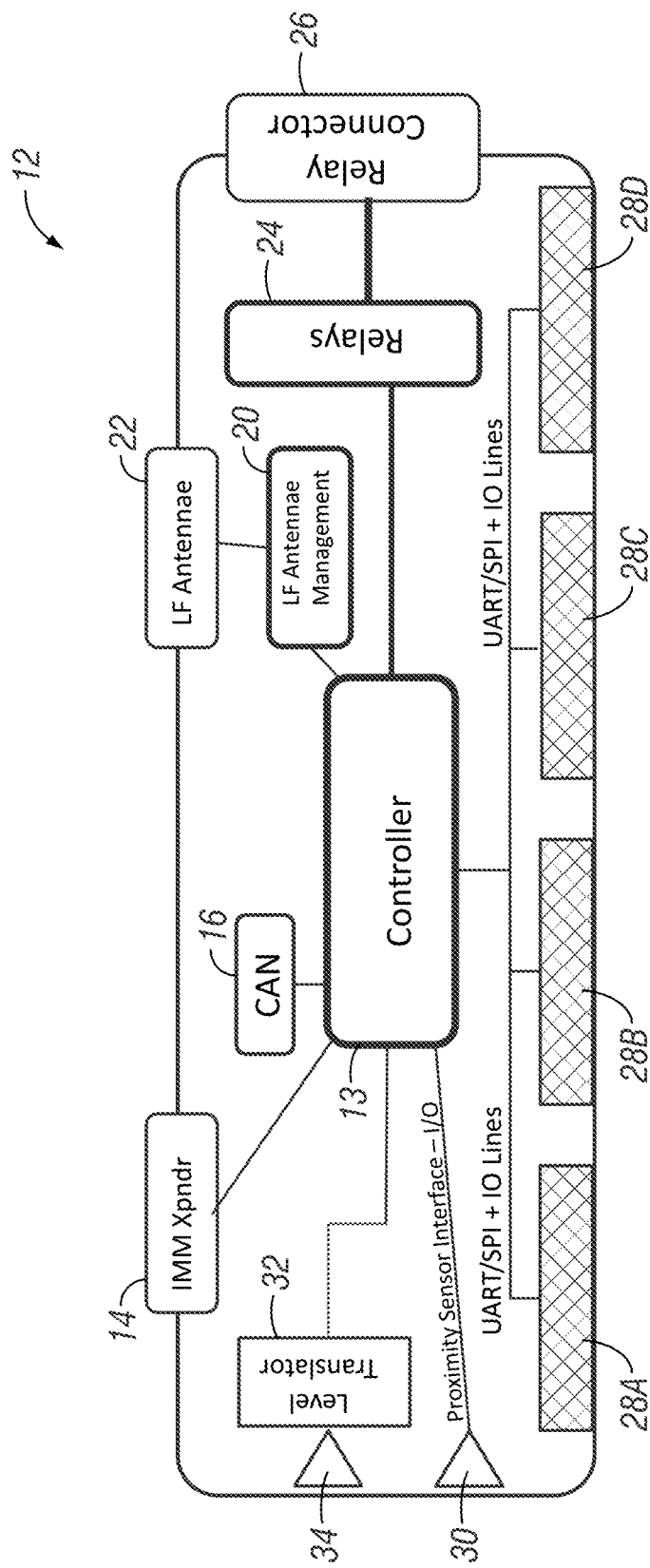
FIG. 2 is a block diagram illustrating one embodiment of the base control module for the vehicle entry system controller of the present invention.

FIG. 2 illustrates a block diagram of the preferred embodiment of the base control module (BCM) 12 internal components of the present invention. These components are aligned to the basic functionality of a passive keyless entry/start/security system. The BCM 12 implements vehicle controller logic and accepts basic/complex I/O interfaces along with a plurality of connectors 28A-D for pluggable modules. The pluggable module connectors (PMC) 28A-D utilize a standard MX34R or similar connector. A controller 13 is a microcontroller with memory and loaded software. This software can be altered with various techniques, either at the manufacturer of the electronics, the installer such as, systems integrator/OEM of the electronics, or at the end customer location via a connected service/programming tool. A low frequency (LF) antennae management device 20 manages communication between the controller 13 and a low frequency (LF) antennae 22. A relay connector 26 provides relay(s) 24 output to control connected devices, such as motors, solenoids, lighting, etc. A level translator 32 converts keypad inputs for communication with the controller 13.

Basic I/O interfaces utilized by the BCM 12 include the following: passive keyless entry (PKE)/immobilizer transponder 14, a Controller Area Network (CAN) 16, low current outputs, pluggable module connectors 28A-D utilizing either a universal asynchronous receiver/transmitter (UART) device or serial peripheral interface (SPI) bus which allow for assignable I/O, a proximity sensor interface, and keypad interface.

Figures 3A, 3B:
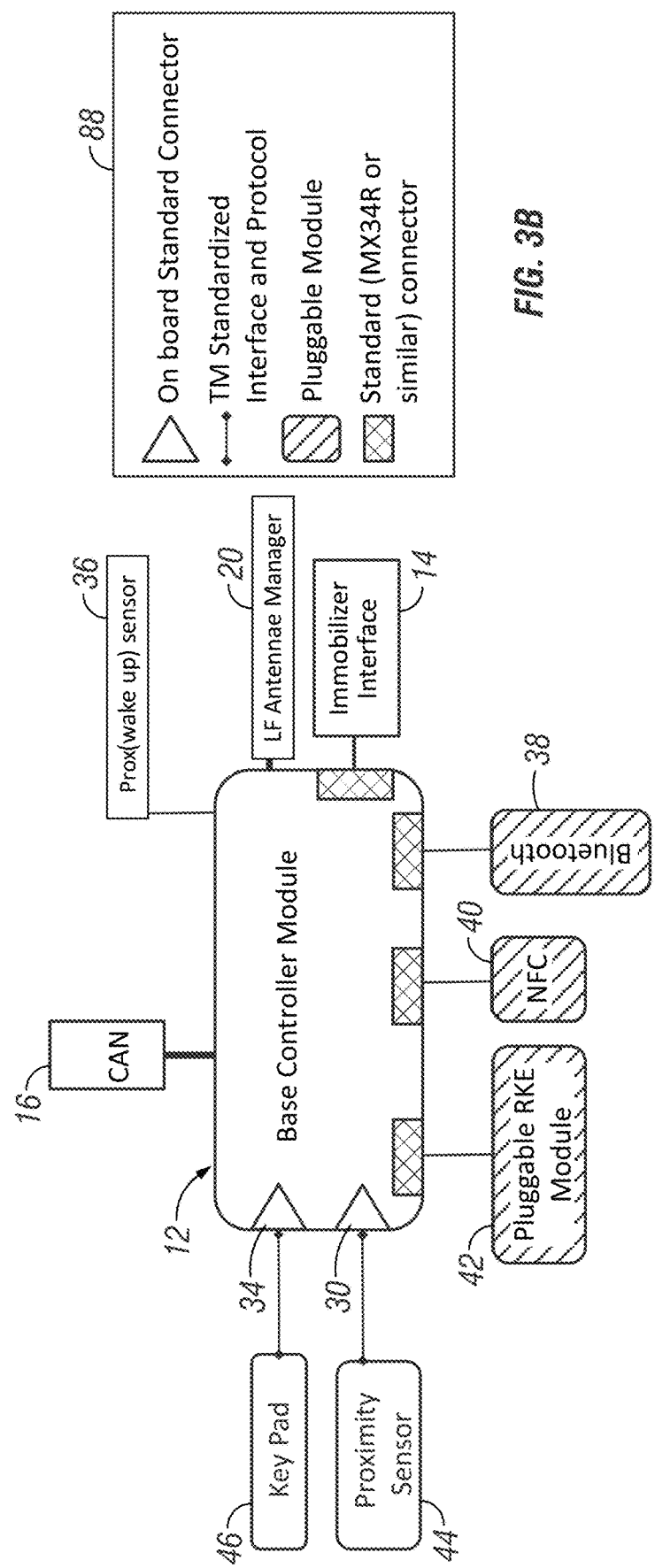
FIG. 3A is a block diagram illustrating one embodiment of the base control module and pluggable modules.
FIG. 3B is connector and interface legend of the present invention.

FIG. 3A illustrates a block diagram of the base controller module 12 with peripheral components of the module. These elements provide the areas of pluggable hardware adaptations and connectivity of the system to other devices of the vehicle/equipment. A keypad 46 interfaces with the keypad connector 34 to support legacy keypad products. A proximity sensor 44 interfaces with the proximity sensor connector 30 for capacitive or switch-based proximity sensing. Pluggable modules may include remote keyless entry (RKE) 42, near field communication (NFC) 40, Bluetooth 38, Wi-Fi (not shown), etc., for added functionality. LF Antennae management 22 which is required for a passive entry/passive keyless pushbutton start system is implemented on the base controller. IMM Xpnder (PKE/Immobilizer Transponder) functions which are required for access and immobilization are also implemented on the base controller through interface 14. A proximity sensor 36 for wake up is also implemented. FIG. 3B illustrates a connector and interface legend 88 for reference.

Figure 4:
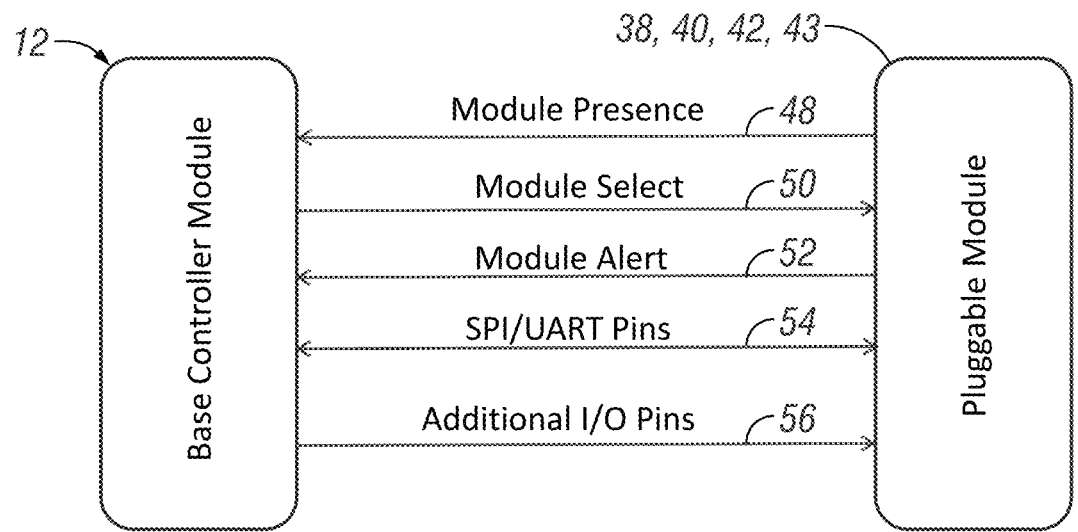
FIG. 4 is a block diagram illustrating one embodiment of the pluggable module interface (PMI).

FIG. 4 illustrates an interconnect I/O between the base controller module (BCM) 12 and the pluggable module interface (PMI). A module presence input line 48 indicates whether a module is present or not. A module selects output line 50 allows the base controller module (BCM) 12 to select a module for communication, e.g. SPI. A module alert input line 52 is an interrupt line from the pluggable module to the base controller for requesting attention. Primarily, this is an interrupt line that wakes up the base controller. SPI/UART pins line 54 allows bi-directional communication with the pluggable module. Depending on requirements, not all pluggable modules need to be smart and require SPI/UART communications. Additional I/O pins can be used to support simple functions. Module capability can be indicated on one of the pins or can be configured on the base module as part of factory setup. Additional I/O pins line 56 allow for this functionality.

The pluggable modules (PM) will implement user interface technologies such as RKE, NFC, Bluetooth, Wi-Fi, and fob management will be implemented via these pluggable modules. The pluggable modules can also be used to extend functionality in the future. GSM/GPS modules can be incorporated in addition to RKE for remote connectivity, driver behavior monitoring, firmware upgrades, etc. The pluggable modules will have board to board connectors such as MX34R or similar connectors. The pluggable modules are expected to be inserted into the system once and very infrequently replaced. Therefore, the connectors are typically rated for 50 plus insertions and removals. The basic protocol between the pluggable module and the base controller will be standardized. Thus, all pins will be made common and the software interface protocol will be common.

Figure 5:
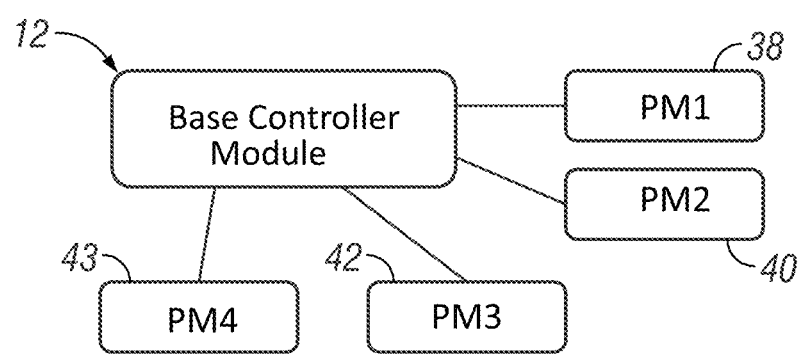
FIG. 5 is a block diagram illustrating one embodiment of the base control module operational flow.

FIG. 5 is a block diagram illustrating one embodiment of the base control module operational flow: Step 1, the base controller module 12 enumerates the pluggable modules 38, 40, 42, or 43 either on startup or when they are inserted into the controller module 12. Step 2, the controller module 12 then goes to sleep waiting for some activity from any of the pluggable modules 38, 40, 42, or 43. Step 3, on alert from a pluggable module, the base control module BCM 12 wakes up, performs required tasks, and then goes back to sleep. The pluggable modules are expected to be asleep most of the time waiting for a trigger from a user. The pluggable modules 38, 40, 42, or 43 will implement basic interactions before alerting the base control module 12 for operations, for example, if or when RKE 42 presents credentials to fob 98, RKE 42 can perform operations before alerting the base control module 12. The base control module 12 will perform any handoff from one module to another, for example, if NFC 40 is used for proximity detection and then Bluetooth 38 for authentication, the handoff between the NFC module 40 and the BT module 38 will be handled by the base control module 12.

Figure 6:
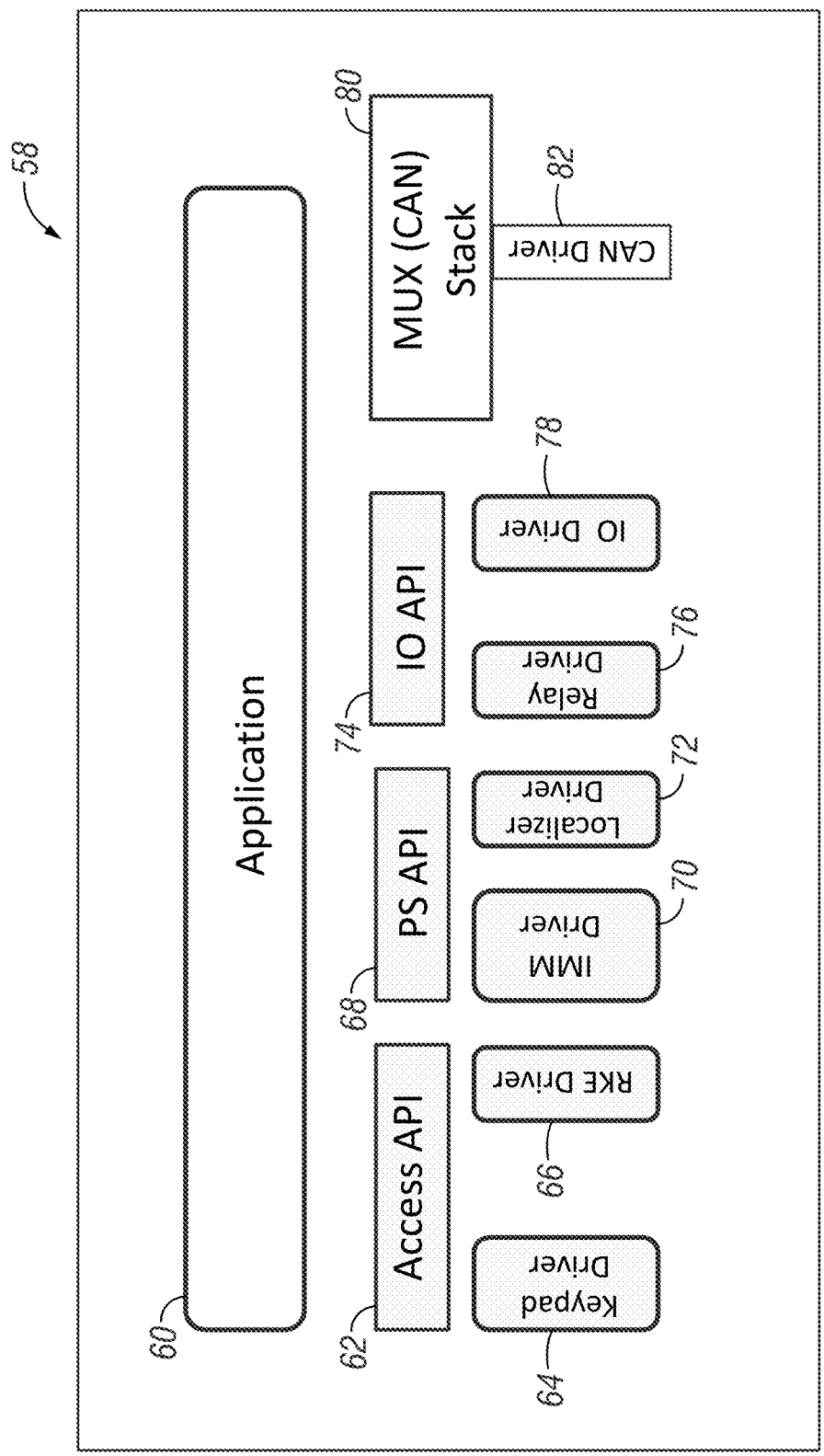
FIG. 6 is a block diagram illustrating one embodiment of the base controller firmware architecture.

FIG. 6 is a block diagram illustrating one embodiment of the base controller firmware architecture 58. The firmware architecture 58 is assigned to an application 60. An access API 62 utilizes a set of clearly defined methods of communication between keypad drivers 64, RKE drivers 66 and application 60. A PS API 68 utilizes a set of clearly defined methods of communication between an IMM driver 70, a localization driver 72 and the application 60. An I/O API 74 utilizes a set of clearly defined methods of communication between a relay driver 76, I/O drivers 78 and application 60. A communication (CAN) stack 80 utilizes a set of clearly defined methods of communication between CAN drivers 82 and the application 60.

Figure 7A:
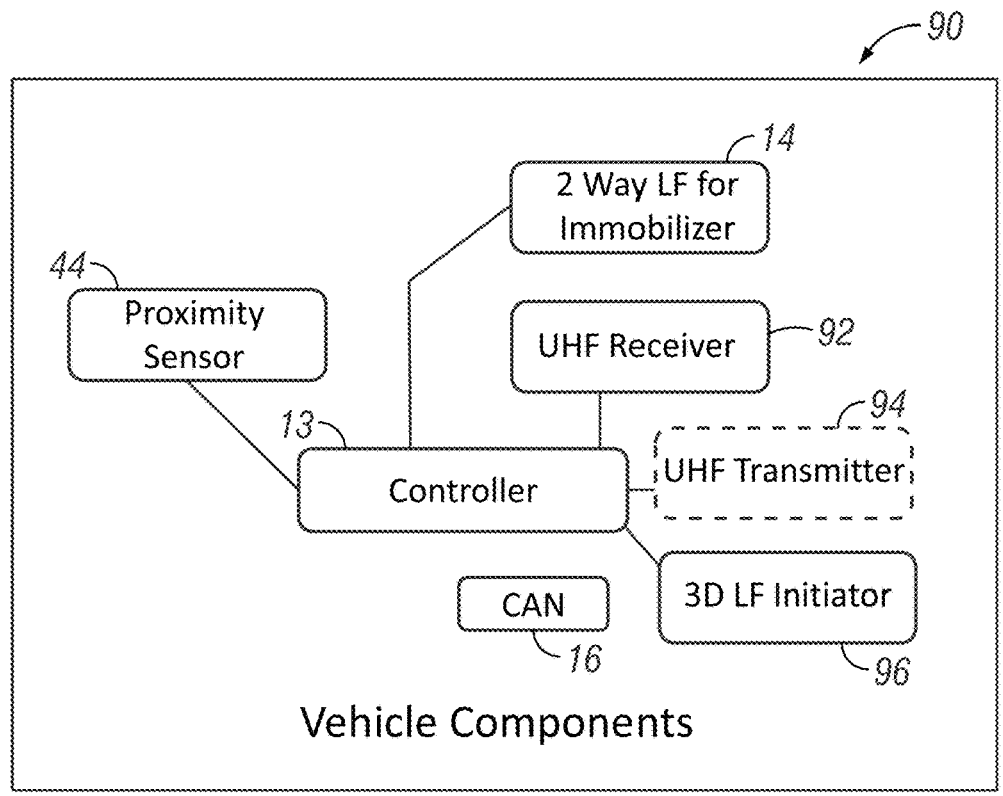
FIG. 7A-B is a block diagram illustrating PKE for access and immobilization control overview.
Figure 7B:
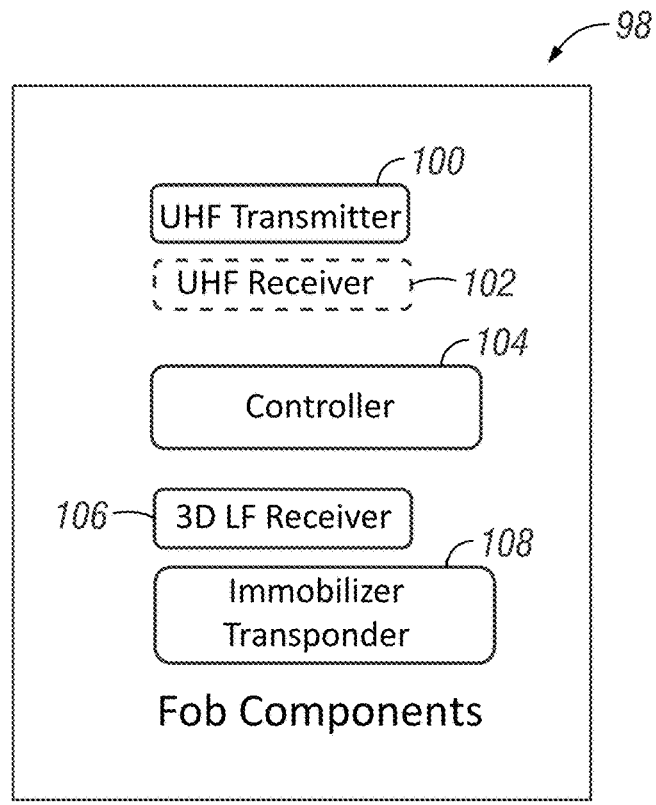

FIG. 7A-B is a block diagram illustrating PKE for access and immobilization control overview and theory of operation. A vehicle 90 has components (FIG. 7A), comprising a proximity sensor 44, a 2-way LF for immobilizer functions 14, a UHF receiver 92, a UHF transmitter 94, and a 3D LF initiator 96, which all interface with the controller 13. A fob 98 has components (FIG. 7B), comprising a UHF transmitter 100, a UHF receiver 102, a 3D LF receiver 106, and an immobilizer transponder 108 which all interface with a controller 104. The controller 104 is similar in operation to controller 13. When a person approaches the vehicle 90, the vehicle's proximity sensor(s) 44 will sense when the person approaching places their hand on or close to the capacitive sensor. The sensors 44 may be mounted on handles or other locations on the vehicle 90. The base control module 12 will turn on the 3D LF initiator 96 and wait for an authorized fob to respond. The 3D LF receiver 106 of the fob 98 is energized by the 3D LF initiator 96 of the vehicle 90. The fob 98 will present the vehicle 90 with authorization information via the UHF transmitter 100. The vehicle 90 receives the fob 98 authorization information via the UHF receiver 92. The vehicle 90 authorizes the fob 98 and allows entry into the vehicle. The vehicle 90 localizes the fob 98 inside the car and enables passive keyless pushbutton start, or remote start.

A key aspect of passive entry system (PES) is proximity sensing. A PES needs to unlock the door locks as the user operates the exterior door handle. Proximity sensing can be achieved by variety of means such as, capacitive sensors located in and around door 30 handles or the vehicle body and/or an infrared sensor below or around the door handle. One example of such a capacitive sensing handle assembly 11 (see FIG. 1) is described in Applicant's co-pending application filed on Mar. 6, 2017 (Ser. No. 15/450,997) and entitled Power Locking Door Handle with Capacitive Sensing, which is incorporated herein by reference.

LF Antennae placement determines the area around which passive entry is sensed. The simplest scenario is to place antennae around the door. If PES needs to be enabled across the entire vehicle, then the LF antennae needs to be placed around the entire vehicle. Similarly, antennae placement inside the vehicle determines how the fob will be localized to allow passive keyless pushbutton start. It is common to require multiple antennae inside the vehicle to provide appropriate coverage.

Figure 8:
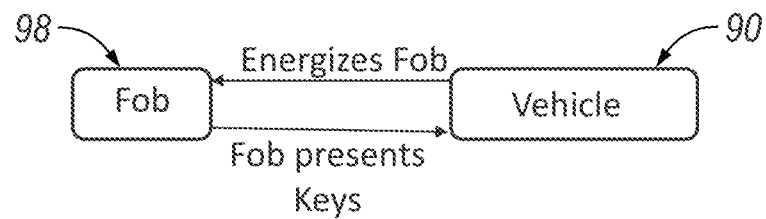
FIG. 8 is a block diagram illustrating system design considerations.

Security is an important aspect for PES systems. Authentication model between the fob and the vehicle can be unidirectional, as shown in FIG. 8, or bi-directional, as shown in FIG. 7A-B. In a unidirectional model, the vehicle 90 authenticates the fob 98. The fob 98 has a RF Transmitter, and the vehicle has a RF receiver. In bi-directional model, the vehicle and the fob authenticate each other using a proprietary handshake. This requires both the fob and controller to have a transceiver, increasing the overall costs as well as current consumption.

Figure 9:
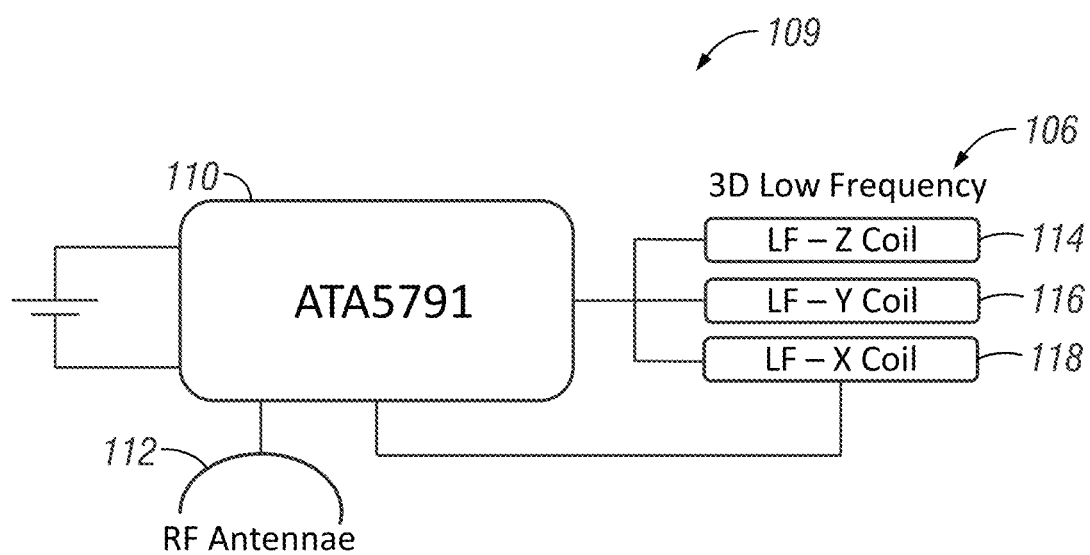
FIG. 9 is a block diagram illustrating one embodiment a multi-channel passive entry system key fob.

A passive entry/passive keyless pushbutton start (PEPS) system block diagram 96 is illustrated in FIG. 9. The system utilizes an integrated microcontroller 110, an RF transmitter/antenna 112, and a 3D low frequency receiver antennae array 113 comprised of a Z-coil 114, a Y-coil 116, and a X-coil 118. The RF transmitter 112 is a fully integrated fractional-N PLL, VCO and loop filter covering 315 MHz and 433 MHz (software programmable) and supports ASK and FSK modulation with data rate up to 40 Kbit/s (Manchester). The PEPS system 109 further utilizes a contactless transponder with open source immobilizer stack which will support unidirectional authentication.

Figure 10A:
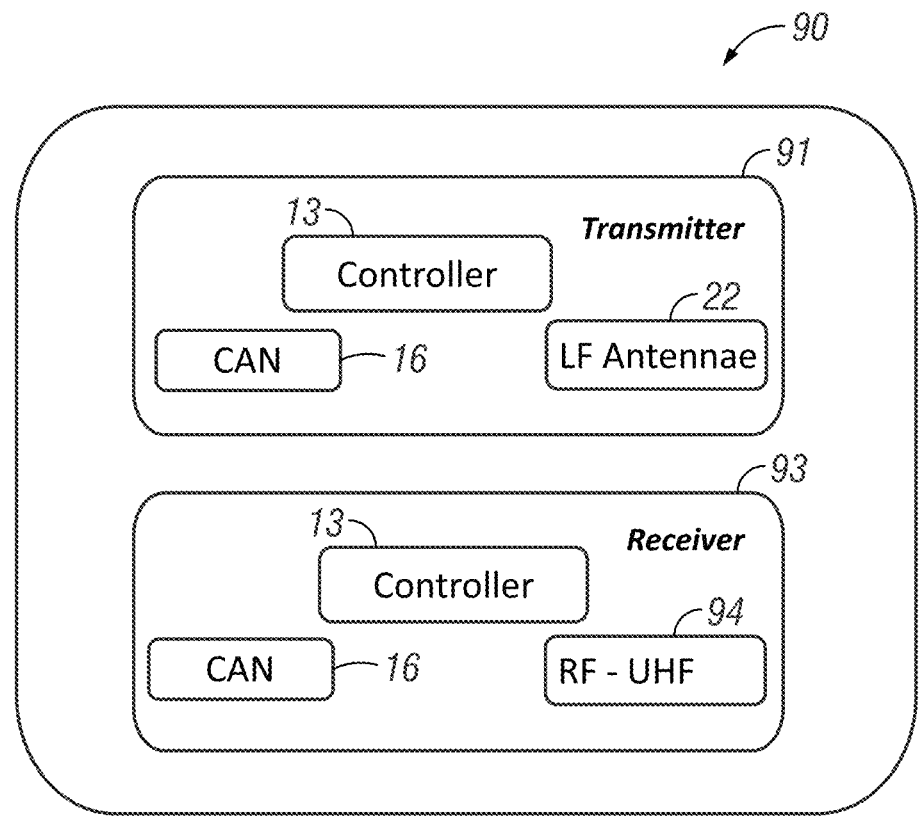
FIG. 10A-B is a block diagram illustrating PKE fob localization/immobilizer function.
Figure 10B:
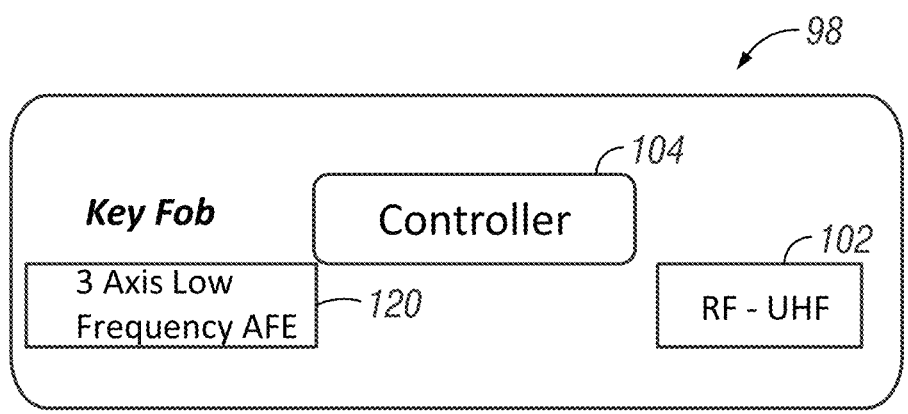

FIG. 10A-B is a block diagram illustrating PKE fob localization/immobilizer function. The vehicle 90 uses a trigger to turn on the initiator. The trigger could be capacitive sensing module(s) on the door handles, trunk, hood, etc. An infrared sensor may be integrated into or on the door handle. Further, the vehicle 90 transmitter unit 91 generates a low frequency signal which LF antennae 22 broadcasts and thus energizes the key fob 98. The key fob 98 authenticates the trigger message and responds via the RF-UHF 102 uplink to the vehicle 90. In one-way models, LF link is used to wake up as well as send messages to the fob. In two-way models, LF is used only for wakeup of the fob, and the RF link is used for all other communications.

Passive entry requires sensing of a key fob. Passive keyless pushbutton start requires localization of the key fob. To implement passive keyless pushbutton start, the location of the key fob 98 needs to be determined. The fob 98 must be located inside the vehicle 90 to allow passive keyless pushbutton start. The fob 98 can be localized by determining which LF antennae the fob responds to a ping from within the vehicle 90. The LF antennae 22 needs to be placed at possible places where the key fob can be placed, such as the dashboard, within cup holders, seats. etc. Radio strengths across 3-axis low frequency AFE 120 are measured to triangulate the fob 98 location. The immobilizer function is typically implemented with a different transponder. The immobilizer function further authenticates the key fob and exchanges keys with standard or proprietary encryption to determine whether to allow electronic control unit (ECU) to start the vehicle.

FIG. 11 illustrates details of a PCB 124 for the base control module 12. The pluggable port 28A is utilized for the key fob 98 functions. The LF initiator module 84 handles LF and RF wireless communications, such as a 125 KHz frequency band for LF frequencies, and a 433 MHz frequency band for the RF. An alternative embodiment of the base control module 12 utilizes additional pluggable ports 28B-D which expand functions for Bluetooth, Wi-Fi, and NFC communications, thus allowing 2-way communications. Further possible configurations 86 can utilize two module ports, such as 28A-B or 28C-D, by adding an additional "daughter" board allowing for greater functionality and security. This provides additional inputs and outputs as well as additional features such as Bluetooth and Wi-Fi. With the mother/daughter board configuration, the mother board will maintain control when it comes to fob detection.

A further embodiment implements a multi-zone controller system which utilizes at least two controllers in a zone 1 and a zone 2 configuration. All controllers will be communicating on the same system CAN bus and will act independently from each other in most instances. Primary features of the system are: (1) Fob detection with sufficient resolution to be able to distinguish between inside a vehicle personnel compartment and external to the driver/passenger entrance door; (2) All controllers will perform independent scans, (Zone 1, Zone 2) as programming requires to determine if an authorized fob is located, and in which specific area of a given zone and based on that detection point will determine what door locking/unlocking access is available; (3) An auto-locking feature could engage and secure all doors of the vehicle if a fob fails to respond to polling, either because the fob is not authorized or fob is not within range. The system could then auto-lock all doors.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A vehicle keyless access system for an on-road or off-road vehicle comprising:
 a. an exterior door handle on the vehicle;
 b. a proximity sensor on the vehicle for detecting proximity relative the exterior door handle;
 c. a base control module in the vehicle, the base control module adaptable for configurable remote passive keyless entry features for the vehicle;
 d. a set of pluggable modules adapted for operative connection to the base control module in the vehicle, each pluggable module having, with respect to the other pluggable modules in the set of pluggable modules:
  i. a different user-interface functionality;
 e. the base control module further comprising an intelligent controller including:
  i. a programmable processor;
  ii. on-board memory; and
  iii. a plurality of inputs and outputs including a pluggable proximity interface for proximity sensing by operative connection to the proximity sensor;
 f. the base control module further comprising a set of configurable hardware pluggable module interfaces in operable connection to the intelligent controller, each configurable hardware pluggable module interface comprising;
  i. a standardized hardware connector having a plurality of pins for a complementary standardized hardware connector for the pins of one of the set of pluggable modules;
  ii. a standardized communication protocol with the intelligent controller and any of the set of pluggable modules;
 g. the base controller further comprising an adaptable software in operative communication with the intelligent controller which assigns different configurations for the pins of a said standardized hardware connector dependent upon the user-interface functionality of the pluggable module by defining the configuration for the pins according to the user-interface functionality of the pluggable module, wherein pluggable module capability determined by which said pluggable module is plugged into a said pluggable module interface is indicated on one of the pins or configured on the base module as a part of factory setup;
 h. so that the same said intelligent controller and said set of hardware pluggable module interfaces and standardized hardware connectors are useable for different pluggable modules by adjustments of the adaptable software without affecting system architecture;
 i. further comprising one of the set of pluggable modules comprising a remote keyless entry (RKE) module with a remote keyless entry user-interface functionality and another of the set of pluggable modules comprising a module with a user-interface functionality different than the RKE module.

2. The vehicle keyless access system of claim 1 wherein the intelligent controller further comprising an intelligent controller that implements:
 i. a controller logic; and
 ii. a set of basic I/O interfaces.

3. The vehicle keyless access system of claim 2 wherein the basic I/O interfaces comprise:
 a. a keypad interface to support legacy keypads.

4. The vehicle keyless access system of claim 2 further comprising one or more of:
 a. an LF antenna management component; and
 b. a passive keyless entry (PKE)/immobilizer transponder.

5. The vehicle keyless access system of claim 1 wherein the pluggable module interface further comprises:
 a. a set of I/O lines that function with SPI or UART protocol as the standardized communication protocol;
 b. all pins of each set of pins is made common;
 c. an interface protocol is made common.

6. The vehicle keyless access system of claim 1 wherein the standardized connectors of the pluggable module comprise:
   a. board to board connectors;
   b. rated for multiple insertions and removals.

7. The vehicle keyless access system of claim 6 wherein the board to board connectors comprise:
   a. a plurality of pins.

8. The vehicle keyless access system of claim 1 in combination with a plurality of said pluggable modules, one for each pluggable module interface.

9. The combination of claim 8 wherein the other of the set of pluggable modules is selected from user interface functionalities comprising at least one of:
   a. PKE;
   b. RKE;
   c. near field communication (NFC);
   d. Bluetooth;
   e. fob management; and
   f. GSM/GPS.

10. A vehicle keyless access system for highly adaptable functionality with an exterior door handle and a base control module operatively installed in a vehicle comprising:
   a. a proximity sensor in or at the exterior door handle;
   b. a base controller in the vehicle and operatively connected to the proximity sensor, the base controller comprising:
      i. a programmable intelligent controller and controller logic for keyless entry;
      ii. a plurality of basic I/O interfaces; and
      iii. a set of pluggable module interfaces comprising:
         A. a standardized connector comprising board-to-board connectors with a plurality of pins;
         B. the pins being reconfigurable by adaptable software associated with the set of pluggable module interfaces;
   c. at least one pluggable module operatively connected to one of the set of pluggable module interfaces, the at least one pluggable module having a user-interface functionality and comprising:
      i. a standardized connector comprising board-to-board connectors adapted for pluggable interfacing with the pins of one of the set of a pluggable module interfaces;
   d. a standardized communication protocol enabled between the base control module and any said pluggable module in one of the set of pluggable module interfaces;
   e. the adaptable software adapted to assign different configurations for the pins of a pluggable module interface dependent upon the user-interface functionality of the pluggable module for those pins, wherein pluggable module capability determined by which said pluggable module is plugged into a said pluggable module interface is indicated on one of the pins or configured on the base module as a part of factory setup;
   f. wherein one of the at least one pluggable module comprises a passive keyless entry user-interface functionality which operates in conjunction with the proximity sensor and door handle.

11. The system of claim 10 wherein the vehicle comprises one of:
   a. an on-road vehicle; or
   b. an off-road vehicle.

12. The system of claim 10 wherein the user-interface functionality of the pluggable module comprises one of:
   a. PKE;
   b. RKE;
   c. NFC;
   d. Bluetooth;
   e. fob management; and
   f. GSM/GPS.

13. The system of claim 10 further comprising a plurality of said pluggable module interfaces on the base control module.

14. The system of claim 13 wherein each of the plurality of pluggable module interfaces is adaptable by programming to interface with any one of said set of pluggable modules.

15. A method of operating keyless entry to an on-road or off-road vehicle having a base controller comprising:
   a. operatively installing an exterior handle assembly on the vehicle, the exterior handle assembly including a proximity sensor adapted to generate a proximity signal;
   b. operatively connecting a base controller in the vehicle to the proximity sensor, the base controller including a plurality of pluggable module interfaces in operative communication to the base controller, each pluggable module interface adaptable to:
      i. receive a pluggable module having one of a variety of user-interface functionalities with standardized connectors with pins;
      ii. communicate with any pluggable module with a standardized protocol via standardized connectors;
   the base controller including a keyless entry pluggable module installed in one of the plurality of the pluggable module interfaces with pins configured by adaptable software associated with the base controller to monitor the proximity sensor at the exterior handle entry for a proximity signal, wherein pluggable module capability determined by which said pluggable module is plugged into a said pluggable module interface is indicated on one of the pins or configured on the base module as a part of factory setup; and
   c. sensing by the keyless entry pluggable module a proximity signal from the proximity sensor and actuating an instruction to unlock the vehicle.

16. The method of claim 15 wherein each of the pluggable module interfaces has a plurality of pins in a connector, and the pins comprise:
   a. I/O lines that function with SPI or UART protocol;
   b. all said pins made common;
   c. an interface protocol made common.

17. The method of claim 15 wherein the I/O lines function with SPI or UART protocol.

18. The method of claim 15 wherein the pluggable modules comprise:
   a. board-to-board connectors.

19. The method of claim 15 wherein the pluggable modules support:
   a. PKE;
   b. RKE;
   c. NFC;
   d. Bluetooth;
   e. fob management; and
   f. GSM/GPS.

20. The method of claim 15 applied to keyless door locking/unlocking access to the vehicle via a user fob further comprising an additional base controller on the vehicle operable with the said base controller to provide multiple zones relative the vehicle each with one or more sensors with sufficient resolution to (a) determine if an authorized said user fob is located within a said zone, and if so a detection point in a specific area of said zone and (b) based on that detection point, determine what door locking/unlocking access is available.

21. The method of claim 15 further comprising expanding the controller functionality with the addition of a daughterboard, and providing electronic control over zones around the vehicle.

22. The method of claim 21 wherein the zones comprise an operator door zone and a cargo/baggage door zone.

* * * * *